（12）United States Patent
Blagoev et al.

(10) Patent No.: US 7,606,917 B1
(45) Date of Patent: Oct. 20, 2009

(54) METHOD, APPARATUS AND SYSTEM FOR PRINCIPLE MAPPING WITHIN AN APPLICATION CONTAINER

(75) Inventors: Jako Blagoev, Varna (BG); Boris Koeberle, Karlsruhe (DE); Ekaterina Zheleva, Sofia (BG); Stephan H. Zlatarev, Stara Zagora (BG)

(73) Assignee: SAP AG, Walldorf (DE)

( * ) Notice: Subject to any disclaimer, the term of this patent is extended or adjusted under 35 U.S.C. 154(b) by 958 days.

(21) Appl. No.: 10/837,134

(22) Filed: Apr. 30, 2004

(51) Int. Cl.
*G06F 15/16* (2006.01)

(52) U.S. Cl. ...................................... 709/229

(58) Field of Classification Search ................. 709/225, 709/227, 229
See application file for complete search history.

(56) References Cited

U.S. PATENT DOCUMENTS

| | | | |
|---|---|---|---|
| 6,594,671 B1 * | 7/2003 | Aman et al. | 707/103 R |
| 6,651,168 B1 * | 11/2003 | Kao et al. | 713/185 |
| 6,892,307 B1 * | 5/2005 | Wood et al. | 726/8 |
| 6,954,792 B2 * | 10/2005 | Kang et al. | 709/229 |
| 6,976,076 B2 * | 12/2005 | Shrader et al. | 709/228 |
| 7,017,051 B2 * | 3/2006 | Patrick | 726/12 |
| 7,089,584 B1 * | 8/2006 | Sharma | 726/4 |
| 7,340,714 B2 * | 3/2008 | Upton | 717/102 |
| 2002/0143943 A1 * | 10/2002 | Lee et al. | 709/225 |
| 2004/0168060 A1 * | 8/2004 | Patrick | 713/168 |

* cited by examiner

*Primary Examiner*—Jeffrey Pwu
*Assistant Examiner*—Farhad Ali
(74) *Attorney, Agent, or Firm*—Blakely Sokoloff Taylor & Zafman

(57) ABSTRACT

According to one aspect of the invention, a computing system capable of communicating with first and second user managers, the first user manager to perform authentication and authorization services for a first resource and the second user manager to perform authentication and authorization services for a second resource, is provided. The computing system comprises a container having an application, a first user store associated with the first user manager, and a second user store associated with the second user manager stored therein, the application to send a first user manager command to the first user store in a first format and a second user manager command to the second user store in the first format, the first user store to translate the first format into a second format and send the second format to the first user manager, the second user store to translate the second format into a third format and send the third format to the second user manager.

23 Claims, 5 Drawing Sheets

METHOD, APPARATUS AND SYSTEM FOR PRINCIPLE MAPPING WITHIN AN APPLICATION CONTAINER

BACKGROUND OF THE INVENTION

1). Field of the Invention

This invention relates to a computing system, in particular a computing system for accessing various resources.

2). Discussion of Related Art

The task of protecting information stored on computers is becoming increasingly difficult and complex as more and more companies are storing an ever increasing amount of data electronically. The job of keeping such information secure is even further hampered by the fact that many of the computers and databases on which this information is stored are remotely accessible through various public networks, such as the internet.

FIG. 1 illustrates an example of a typical computer network system 10, including a client 12 (e.g., a user), a network 14, a container 16, user managers $18_1$-$18_N$, and resources $20_1$-$20_N$. The client 12 is, for example, a computer, or an individual using a computer. The network 14 includes a series of points or nodes (e.g., switches, routers, etc.) interconnected by communication paths. The network may include one or more of the following: the internet, a public network, or a local area network (LAN), and a private network.

The container 16, which may be implemented on a server, includes an application 22 stored thereon. As illustrated, there is one user manager 18 for each of the resources $20_1$-$20_N$. Each of the resources $20_1$-$20_N$, which may be, for example, databases, has a plurality of various files 24 stored thereon.

The client 12 accesses the application 22 within the container 16 through the network 14. Once the client 12 has successfully gained access to the application 22, the application 22 may need to access one or more of the resources $20_1$-$20_N$ on behalf of the client 12. Before the application 22, or the client 12, is granted access to any of the resources, the client 12 must be authenticated and authorized for access.

Authentication is the process of determining whether someone or something is actually who or what it is claiming to be. One common authentication tool uses a user identification and a password, other such tools may use digital certificates. Authorization is the process of giving someone or something permission to do or have something. Thus authentication determines who the client 12 is, and authorization determines what information the client 12 will be able to access.

Each of the user managers $18_1$-$18_N$ authenticate and authorize the application 22, or client 12, to access the particular resource with which it is associated. The resources $20_1$-$20_N$ may be stored on various types of servers or database services such as a Lightweight Directory Access Protocol (LDAP) server, a Database Management Software (DBMS) based server, and a file system (FS) server.

Each of the different user managers $18_1$-$18_N$ may be unique or different amongst each other (e.g., a first user manager may be associated with an LDAP service, a second user manager may be associated with a Kerberos service, etc.) and may utilize a unique "language," or protocol, for communicating with the application 22. Therefore, in order for the application 22 to successfully request authentication and authorization from any particular one of the user managers $18_1$-$18_N$, the application 22 must know which particular protocol that particular user manager utilizes and send requests and/or commands to the particular user manager in the particular language that it uses. For example, if the client 12, or the application 22 on behalf of the client, wishes to perform a high level function, such as "modify group," on two different user managers $18_1$ and $18_2$, two different syntaxes are required. One of the user managers $18_1$ may require the command in the syntax "modify_group" while another user manager $18_2$ requires that the command be in the syntax "mg."

Thus, the application 22 must be designed to comprehend multiple communication protocols in order to communicate with the different user managers $18_1$-$18_N$ in the particular syntaxes that they require. As the number of communication protocols programmed within an application 22 increases, the application 22 becomes more complicated and difficult to program and manage.

Additionally, various types of authentication services may be used by the different user managers $18_1$-$18_N$ or resources $20_1$-$20_N$, each of which may utilize a different login protocol module.

The application 64 can invoke multiple high level commands/requests from the various user managers $58_1$-$58_N$ with only a single communication protocol $P_{API}$ through the common API 66. Examples of the high level commands include commands for managing users and groups of users (e.g., obtain information from a user account, create a user account, delete a user account, modify a user account, define a group, modify a group, delete a group, add a user to a group, remove a user from a group, and add a group to a group.) The application may also invoke authentication commands through the API 66 such as "login" and "logout." In an embodiment, authentication commands that flow through the common API 66 are the same as those used in Java Authentication and Authorization Service (JAAS). These commands include login, logout, abort, and commit).

Each of the user managers $58_1$-$58_N$ is responsible for implementing authentication and authorization services for a corresponding one of the resources $62_1$-$62_N$, and each of the user stores $68_1$-$68_N$ within the container 56 is responsible for communicating with a corresponding one of the user managers $58_1$-$58_N$ in the language/syntax/format $P_1$, $P_2$ ... $P_N$ that the user manager comprehends. That is, each of the user stores $68_1$-$68_N$ is able to communicate with the particular user manager $58_1$-$58_N$ with the communication protocol that it understands.

That is, referring again to FIG. 1, when the client 12 is authenticated through a particular user manager $18_1$, the appropriate principle for the client 12 is sent to the application 22. Then, when the client 12 again attempts to use one of the resources $20_1$, the application 22 sends the principle back to the user manager $18_1$. The user manager $18_1$ then allows the application 22 to access the appropriate files based on the roles associated with the principle.

Each time the client 12 is authenticated by a new user manager, another principle needs to be tracked by the application 22 and/or the login context used by the application 22. As the application 22 has to manage more and more principles, it becomes more complicated and more difficult to manage.

BRIEF DESCRIPTION OF THE DRAWINGS

The invention is described by way of example with reference to the accompanying drawings, wherein.

DETAILED DESCRIPTION OF THE INVENTION

Figure 3:
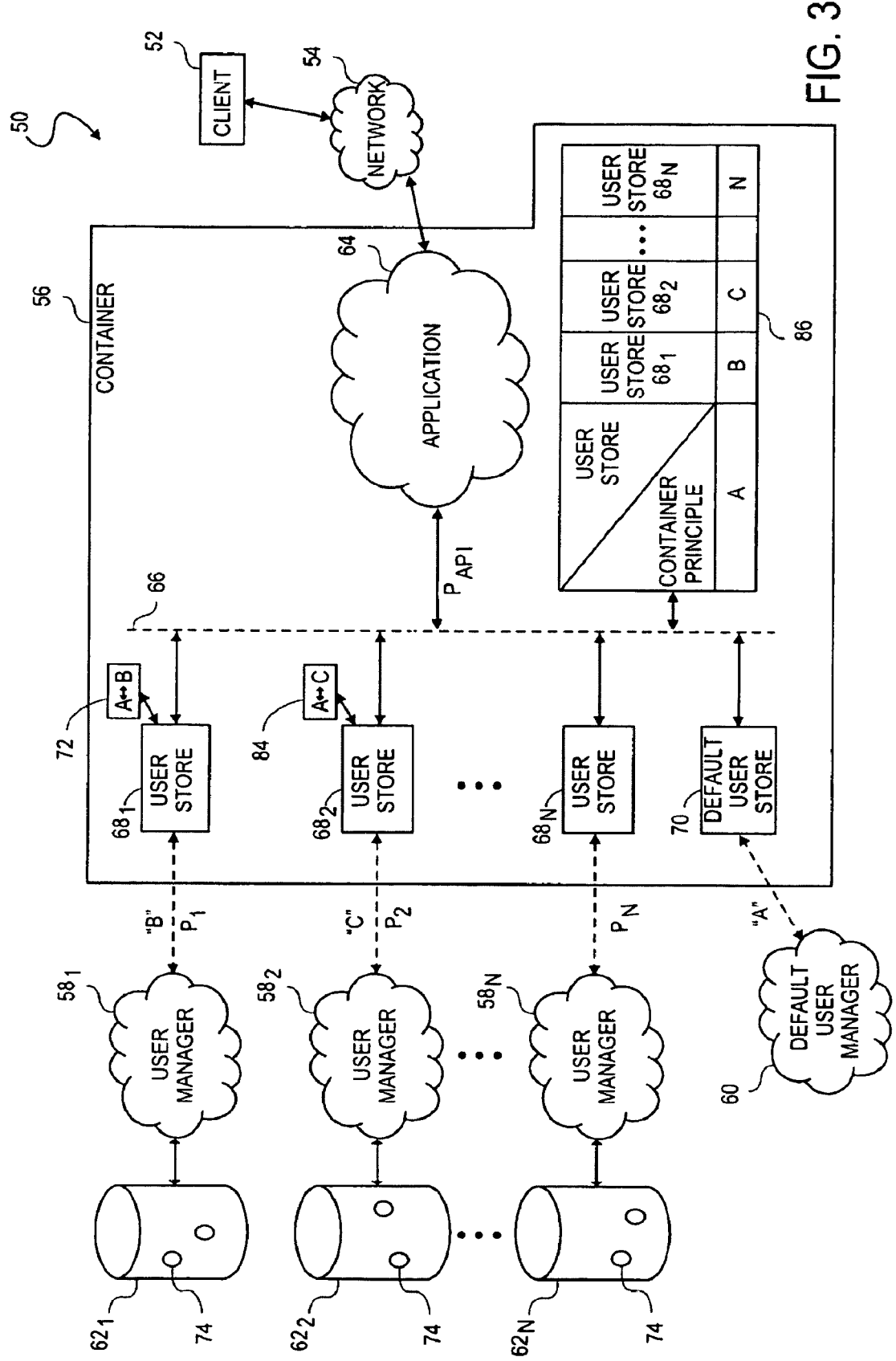
FIG. 3 is a block diagram of a computer network system, including a container with user stores thereon, according to an embodiment of the present invention.
Figure 4:
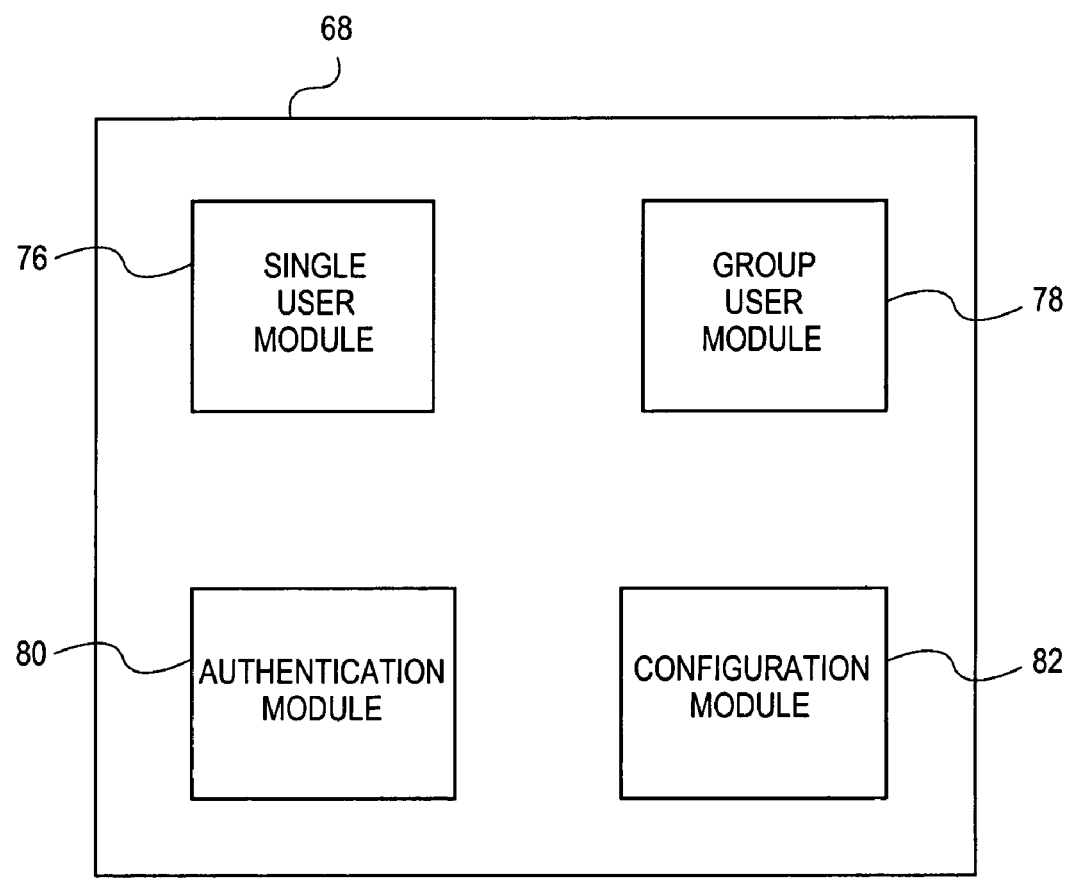
FIG. 4 is a block diagram of one of the user stores illustrated in FIG. 3.

FIG. 3 and FIG. 4 illustrate a computer network system or a computing system infrastructure according to an embodiment of the present invention. The computing network system includes a container and a plurality of resources, each of which is associated with a user manager. The container includes an application and a plurality of user stores, each of which is associated with one of the user managers. The application is connected to the user stores through a common application programming interface. The application sends commands to the user managers in a single computing language through the user stores. Each user store translates the commands into the particular computing languages utilized by its respective user manager. The container may also include a principle map, separate from the application, to store principles received from the user managers.

FIG. 3 illustrates a computer network system 50 according to an embodiment of the invention. The computer network system 50 includes a client 52, a network 54, a container 56, user managers $58_1$-$58_N$, a default user manager 60, and resources $62_1$-$62_N$.

The client 52 is, for example, a computer, or an individual using a computer or another application running on a computer. The network 54 includes a series of points or nodes (e.g., switches, routers, etc.) interconnected by communication paths. The network 54 may include one or more of the following: the internet, a public network, or a local area network (LAN), and a private network.

The container 56, which may be implemented on a server or other computing system, includes an application 64, a common application programming interface (API) 66, user stores $68_1$-$68_N$, a default user store 70, and a principle map 72. Although only one principle map 72 is illustrated as being connected to one user store $68_1$, it should be understood that other principle maps may be connected to the other user stores $68_1$-$68_N$, or the container 56 may contain multiple principle maps, one for each of the user stores $68_1$-$68_N$. The common API 66 is a communication syntax between application 64 and each of the user stores $68_1$-$68_N$ and the default user store 70.

The application 64 can invoke multiple high level commands/requests from the various user managers $58_1$-$58_N$ with only a single communication protocol through the common API 66. Examples of the high level commands include commands for managing users and groups of users (e.g., obtain information from a user account, create a user account, delete a user account, modify a user account, define a group, modify a group, delete a group, add a user to a group, remove a user from a group, and add a group to a group.) The application may also invoke authentication commands through the API 66 such as "login" and "logout." In an embodiment, authentication commands that flow through the common API 66 are the same as those used in Java Authentication and Authorization Service (JAAS). These commands include login, logout, abort, and commit).

Each of the user managers $58_1$-$58_N$ is responsible for implementing authentication and authorization services for a corresponding one of the resources $62_1$-$62_N$, and each of the user stores $68_1$-$68_N$ within the container 56 is responsible for communicating with a corresponding one of the user managers $58_1$-$58_N$ in the language/syntax/format that the user manager comprehends. That is, each of the user stores $68_1$-$68_N$ is able to communicate with the particular user manager $58_1$-$58_N$ with the communication protocol that it understands.

As illustrated, the default user store 70 is associated with the default user manager 60.

FIG. 4 illustrates a template for any one of the user stores (68 in FIG. 4). The user store 68 includes a "single user" module 76, a "group user" module 78, an authentication module 80, and a configuration module 82. Each of modules within the user store 68 contains programming code for "translating" between: 1) the high level commands/requests discussed above provided by the application 64 though the common API 66; and 2) the particular communication protocols used by the various user managers $58_1$-$58_N$.

The single user module 76 includes code for translating common API 66 commands from the application 64 dealing with single users (e.g., obtaining information from a user account, creating a user account, deleting a user account, modifying a user account, etc.).

The group user module 78 includes code for translating common API 66 commands dealing with groups of users (e.g., defining a group, modifying a group, deleting a group, adding a user to a group, removing a user from a group, adding a group to a group, etc.).

The authentication module 80 includes code for translating common API 66 for commands dealing with the authentication of users (e.g., login, logout, abort, commit, etc.). In an embodiment, the authentication module 80 takes the form of the authentication approach shown in FIG. 2 and may also include the same login modules that are used in JAAS. Here, the login context is invoked through the common API 66 by the application 64 and the appropriate login module is invoked by the login context to carry out authentication with the user manager.

The configuration module 82 includes various configurable information used for communication with one of the particular user managers $58_1$-$58_N$, such as the IP address and port of the particular user manager. The configuration module 82 may also include restrictions on users, such as a minimum character requirement for attempting to access a particular user manager or resource, and information regarding the use of specific transport protocols for certain types of communication, such as secure socket layer (SSL).

The default user manager 60 is the user manager that performs authentication and authorization services for the applications within the container (rather than any of resources $62_1$-$62_N$). Therefore, in use, referring again to FIG. 3, when the client 52 attempts to gain access to the application 64 within the container 56, the client 52 must first be authenticated and authorized by the default user manager 60. When the client 52 has been successfully authenticated and authorized for access to the application 64, a default principle, "A" for example, is sent from the default user manager 60. Thus the client 52 is recognized as principle "A" for purposes of authorizing the client's 52 access within the container 56.

Figure 1:
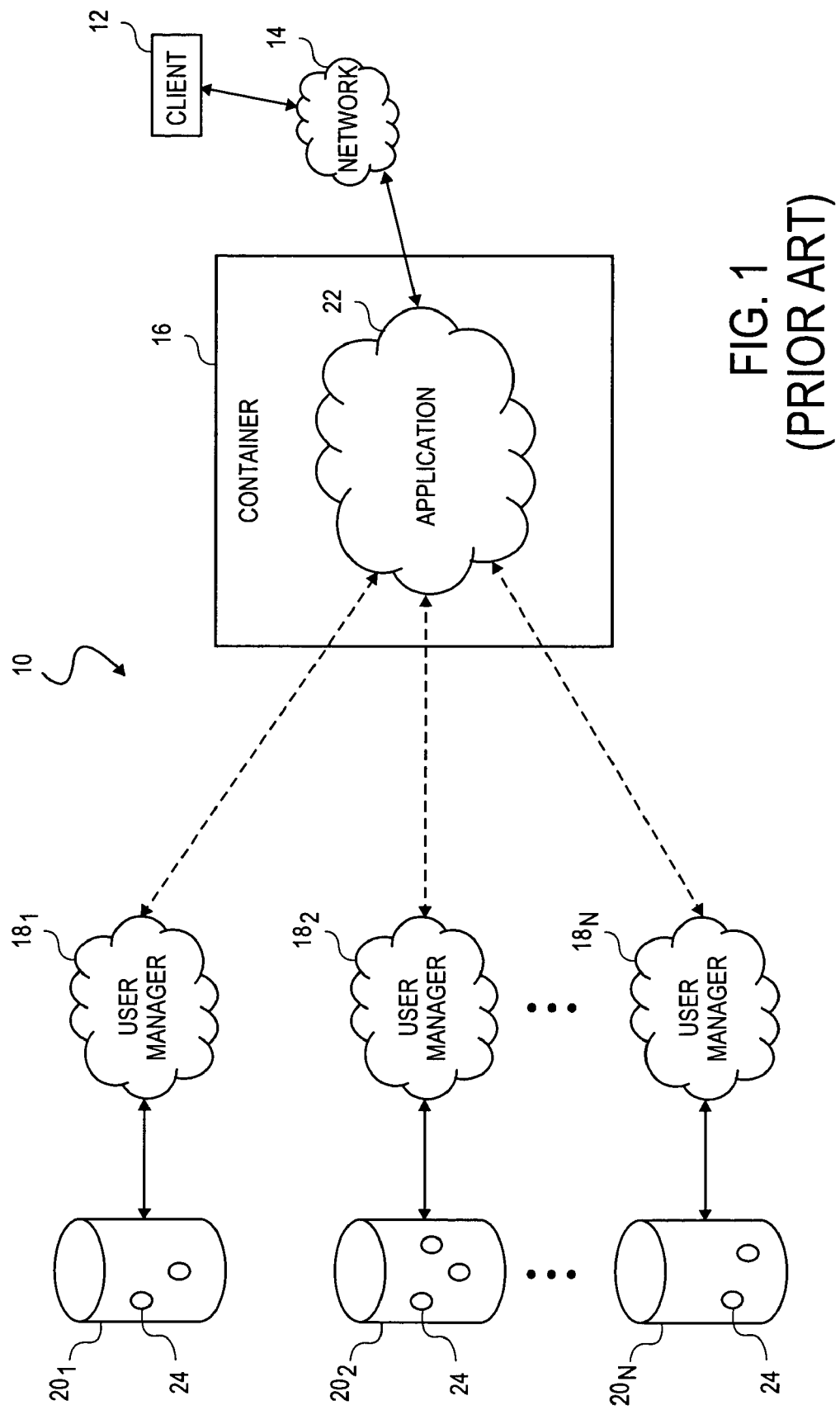
FIG. 1 is a block diagram of a prior art computer network system.
Figure 2:
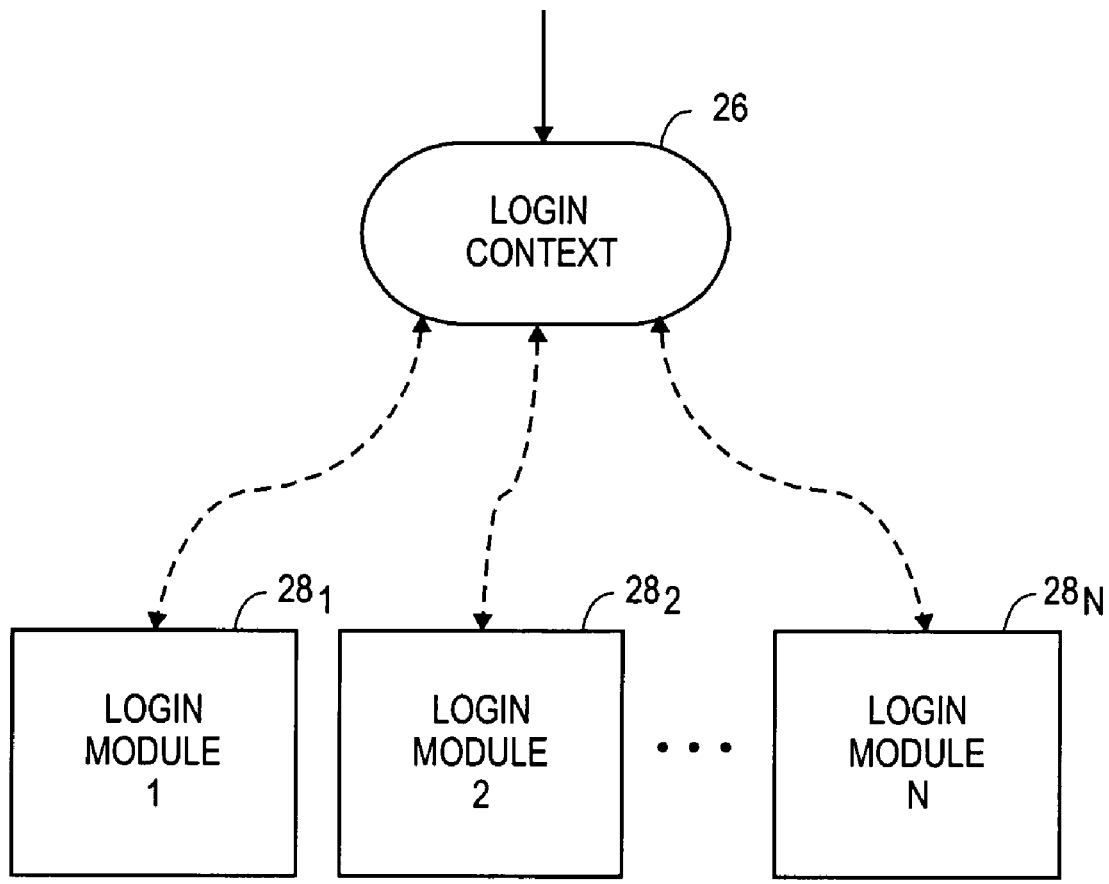
FIG. 2 is a block diagram of a login context and associated login modules.

The client 52 may then attempt to access one of the resources $62_1$-$62_N$. When the client 52 attempts to access one of the resources $62_1$, a high level authentication command, such as "login," is sent through the common API 66 to user store $68_1$ associated with user manager $58_1$ that communicates with resource $62_1$ that the client 52 is attempting to access. In an embodiment, where user store $68_1$ conforms to the design approach of FIG. 4, the authentication module 80 of user store $68_1$ is used. If the approach of FIG. 2 is used for the authentication module 80, the appropriate login module for use with user store 68₁ is invoked by the login context in response to the "login" command sent by the application 64 over the common API 66.

Once the client 52, or the application 64 on behalf of the client, 52 has been authenticated for access to user manager 58₁, another principle for use with user manager 58₁ ("B" for example) is sent from user manager 58₁ to user store 68₁ as illustrated in FIG. 3. The principle B is then stored within the principle map 72. Here, as part of the application's 64 initial invocation of user store 68₁ on behalf of the client 52 for authentication services (i.e., the aforementioned "login" request sent over the common API 66), user store 68₁ was told that the authentication was for principle "A." That is, for example, the user store 68₁ was instructed to "login" principle "A" for access to resource 62₁. The principle map 72 essentially maps the container principle value "A" to user manager 58₁ principle value "B" for the same user (in this case, client 52). It should be noted that the principle "B" received from user manager 58₁ need not be stored within the application 64. Rather, the principle B may be stored within the principle map 72 that is maintained by user store 68₁ (or same entity other than the application 64).

Through the principle map 72, user store 68₁ is able to recognize that the principles A and B have been granted to the same client, and thus, when the client 52, or application 64 on behalf of the client 52, again attempts to access resource 62₁, the client 52 is identified as "A" across the common API 66 and the user store 68₁ simply sends principle B back to user manager 58₁. That is, user store 68₁ "looks up" the appropriate principle (B) from the principle map 72 for the client 52 that is requesting access to resource 62₁ (who is identified as principle A). The client 52 may then access various files 74 on resource 62₁ based on the roles that user manager 58₁ has assigned to principle B.

If the client 52 also attempts to access a second resource 62₂, the client 52 must be authenticated and authorized by a second user manager 58₂ that controls access to the second resource 62₂. The application 64 sends a "login" command through the common API 66 along with the identity of the client 52 as recognized by the container 56 (principle A) to a second user store 68₂ (i.e., using the same communication protocol as was used to access the first resource 62₁). The second user store 68₂ invokes authentication services by user manager 58₂.

Thus, the application 64 is able to communicate with the different user managers 58₁-58ₙ by sending commands in a single communication protocol and does not have to be programmed with multiple communication protocols. That is, for example, for both of the accesses to resources 62₁ and 62₂, the application communicated "login A" to both of user stores 58₁ and 58₂.

Once the client 52 is authenticated by the second user manager 58₂, the second user manager 58₂ sends a principle, "C" for example, to the second user store 68₂. The principle C may then be stored within a second principle map 84 as illustrated in FIG. 3. As before, the second principle map 84 maps a relationship between the received principle (C) and the default principle (A) of the client 52. Thus, the second user store 68₂, using the second principle map 84, will be able to recognize that the principle C and the default principle A are for the same client and, as a consequence, will be able to identify client 52 as principle "C" for future uses related to resource 62₂.

For example, the second user store 68₂ is able to send principle C back to the second user manager 58₂ so that the client 52 may be authorized to access the files 74 within the second resource 62₂ which are based on the roles that the second user manager 58₂ has assigned to principle C.

If the application 64 (e.g., at the commands of the client 52) attempts to perform a high level modification to the user records of user manager 58₁, such as "modify user group," a high level command is sent through the common API 66 to the user store 68₁ associated with user manager 58₁ that is connected to the resource 62₁ that the client 52 is attempting to access. This high level command is sent in the communication protocol used by the application 64, in a syntax not particularly utilized by the particular user manager 58₁.

User store 68₁ essentially "translates" the high level command into the particular communication protocol and syntax that is used by the particular user manager 58₁ that the client 52 is attempting to access. For example, the "modify user group" command may be translated into "modify_group." The "translation" of the high level command into the particular communication protocol of the particular user manager 58₁ is pulled from one of the modules within the user stores being accessed. For example, as discussed above, the translation for the "modify user group" is stored in the group user module 78 as illustrated in FIG. 4.

If the application 64 (e.g., at the commands of the client 52) attempts to perform a high level modification to the user records of the second user manager 58₂, such as "modify user group," a high level command is sent through the common API 66 to the user store 68₂ associated with the second user manager 58₂ that is connected to the second resource 62₂ that the client 52 is attempting to access. This high level command is sent in the communication protocol used by the application 64. The second user store 68₂ translates the communication protocol used by the application 64 into the particular communication protocol and syntax used by the second user manager 58₂. For example, the "modify user group" command may be translated into "mg."

As illustrated in FIG. 3, the container 56 may also utilize a centralized principle map 86. The centralized principle map 86 may be connected to the application 64 and the user stores 68₁-68ₙ through the common API 66. In such an embodiment, the centralized principle map 86 would be able to store principles received from the default user manger 60 and the user managers 58₁-58ₙ and map relationships between the principles that would be used by the client 52 in accessing the resources 62₁-62ₙ.

Figure 5:
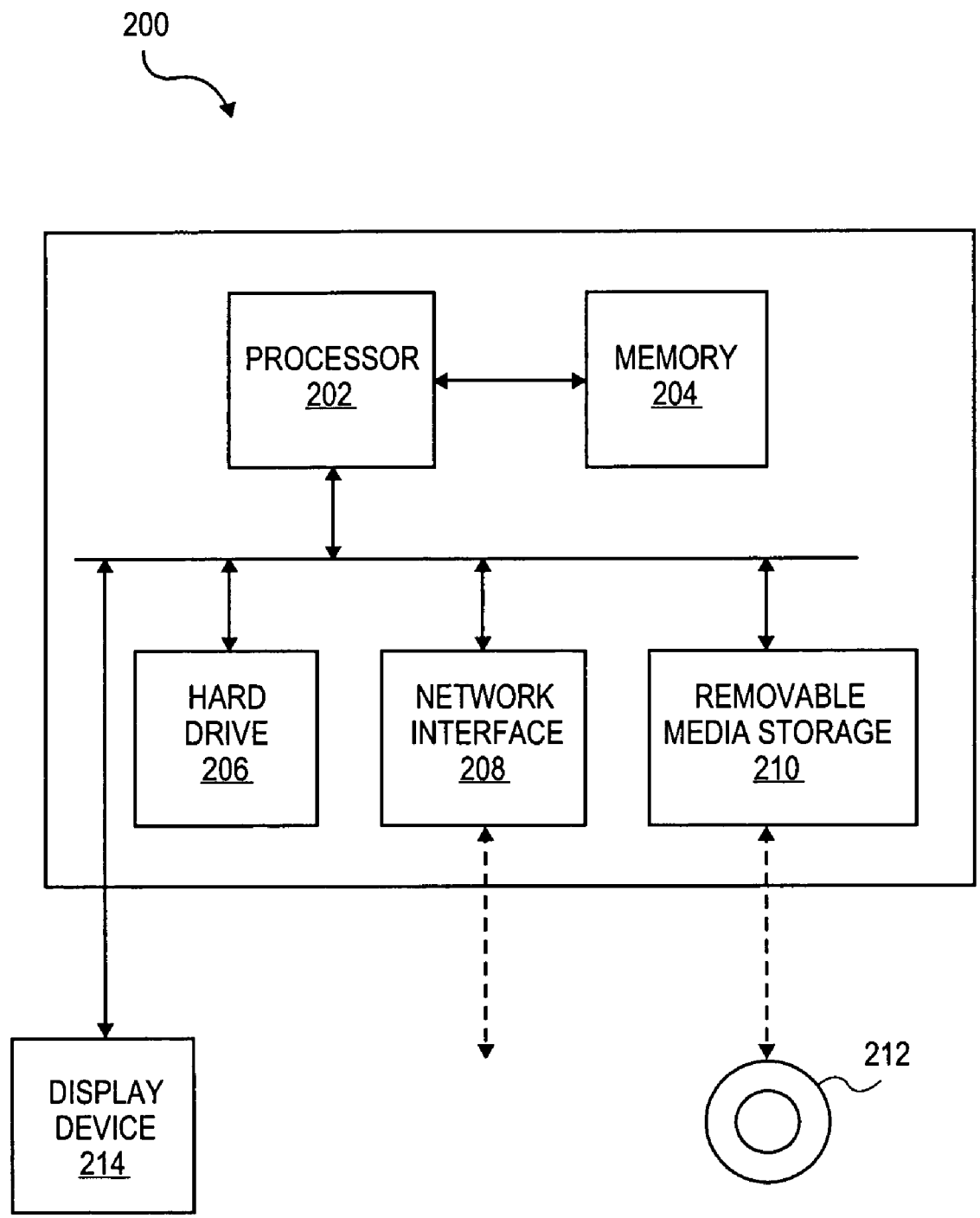
FIG. 5 is a block diagram of a computing system.

FIG. 5 is a block diagram of a computing system 200 that can execute program code stored by an article of manufacture. The computing system 200 includes a processor 202, a memory 204, a hard drive 206, a network interface 208, a removeable media drive 210, and a CD-ROM 212, and a display device 214. It is important to recognize that the computing system of FIG. 5 is just one of various computing architectures. The applicable article of manufacture may include one or more fixed components (such as a hard disk and a memory) and/or movable components such as a CD-ROM, a compact disc, a magnetic tape, etc. In order to execute program code, typically instructions of the program code are loaded into the memory 204, such as Random Access Memory (RAM), and the processor 202, or microprocessor, then executes the instructions.

The computing system of FIG. 5 may be incorporated at various places within the networked computing system infrastructure 50 of FIG. 3.

The processes taught by the discussion above can be practiced within various software environments such as, for example, object-oriented and non-object-oriented programming environments, Java based environments (such as a Java 2 Enterprise Edition (J2EE) environment or environments defined by other releases of the Java standard, or other environments (e.g., a .NET environment, a Windows/NT environment, each of which is provided by Microsoft Corporation).

Processes taught by the discussion above may be performed with program code such as machine-executable instructions which cause a machine (such as a "virtual machine", general-purpose processor or special-purpose processor) to perform certain functions. Alternatively, these functions may be performed by specific hardware components that contain hardwired logic for performing the functions, or by any combination of programmed computer components and custom hardware components.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A computing system comprising:
    a first server to exchange communications with a first user manager and with a second user manager, the first server including a container having stored therein
        a first user store associated with the first user manager;
        a second user store associated with the second user manager;
        an application in communication with the first user store and with the second user store, the application to access a first resource and a second resource for a client of the first server; and
    a principle map separate from the application, the principle map including:
        a default principle sent to the first server from a default user manager in response to the default user manager authenticating the client for an access to the application,
        a first principle stored by the first user store, the first principle sent to the first server from the first user manager in response to an authentication of the application for access to the first user manager, and
        a second principle stored by the second user store, the second principle sent to the first server from the second user manager in response to an authentication of the application for access to the second user manager,
    wherein the principle map to map the first principle and the second principle to the default principle,
    wherein the first user store to receive a first user manager command sent from the application in a first format, the received first user manager command including the default principle to indicate that an accessing of the first resource via the first user manager is on behalf of the client, the first user store to respond to the receiving the first user manager command, including
        accessing the principle map with the default principle from the first user manager command to retrieve the first principle,
        translating the first user manager command from the first format to a second format, the translated first user command including the retrieved first principle, and
        sending the translated first user manager command from the first server to the first user manager, and
    wherein the second user store to receive a second user manager command sent from the application in the first format, the received second user manager command including the default principle to indicate that an accessing of the second resource via the second user manager is on behalf of the client, the second user store to respond to the receiving the second user manager command, including
        accessing the principle map with the default principle from the second user manager command to retrieve the second principle,
        translating the second user manager command from the first format to a third format, the translated second user command including the retrieved second principle, and
        sending the translated second user manager command from the first server to the second user manager.

2. The computing system of claim 1, wherein the application is connected to the user stores through a common application programming interface.

3. The computing system of claim 2, wherein the common application programming interface interconnects the principle map and the application.

4. The computing system of claim 3, further comprising the client to attempt to access the application and the first and second resources.

5. The computing system of claim 4, wherein the first and second user managers are to authenticate and authorize the client to access the first and second resources.

6. The computing system of claim 5, wherein the default user manager is to authorize the client for access to the container.

7. The computing system of claim 6, wherein the container further comprises a default user store associated with the default user manager.

8. The computing system of claim 7, wherein the first and second user stores contain translations of the first format into respective ones of the second and third formats.

9. The computing system of claim 8, wherein the first and second user stores comprise a single user module, a group user module, an authentication module, and a configuration module, the single user module including translations for single user commands, the group module including translations for group user commands, and the authentication module including translations for authentication commands.

10. The computing system of claim 9, wherein the single user commands are to perform at least one of:
    obtaining information from a user account;
    creating a user account;
    deleting a user account; and
    modifying a user account.

11. The computing system of claim 9, wherein the group user commands are to perform at least one of:
    defining a group;
    modifying a group;
    deleting a group;
    adding a user to a group;
    removing a user from a group; and
    adding a group to a group.

12. The computing system of claim 9, wherein the authentication commands are to perform at least one of:
logging in;
logging out;
aborting; and
committing.

13. The computing system of claim 9, wherein the first and second resources are selected from the group consisting of:
a Lightweight Directory Access Protocol server;
a Database Management Software based server; and
a file system server.

14. The computing system of claim 13, wherein the first and second user managers utilize an authentication service selected from the group consisting of:
Keberos;
Unix;
Windows NT; and
Biometric authentication.

15. A method comprising:
receiving at a server a default principle sent from a default user manager in response to the default user manager authenticating a client of the server for access to an application within a container of the server;
receiving at a first user store in the container a first principle sent to the server from a first user manager in response to an authentication of the application for access to the first user manager;
receiving at a second user store in the container a second principle sent to the server from the second user manager in response to an authentication of the application for access to the second user manager;
the first user store storing the received first principle in a principle map within the container and separate from the application;
the second user store storing the received second principle in the principle map;
with the principle map, mapping the received default principle to the received first principle and the received second principle;
receiving at the first user store a first user manager command sent from the application in a first format, the received first user manager command including the default principle to indicate that an accessing of a first resource via the first user manager is on behalf of the client;
the first user store responding to the receiving the first user manager command, including
accessing the principle map with the default principle from the first user manager command to retrieve the first principle,
translating the first user manager command into a second format, the translated first user command including the retrieved first principle, and
sending the translated first user manager command to the first user manager, and
receiving at the second user store a second user manager command sent from the application in the first format, the received second user manager command including the default principle to indicate that an accessing of a second resource via the second user manager is on behalf of the client;
the second user store responding to the receiving the second user manager command, including
accessing the principle map with the default principle from the second user manager command to retrieve the second principle,
translating the second user manager command into a third format, the translated second user command including the retrieved second principle, and
sending the translated second user manager command to the second user manager.

16. The method of claim 15, wherein the first user store and the second user store are connected to the application through the common application programming interface.

17. The method of claim 16, the principle map connected to the application through the common application programming interface.

18. An article of manufacture including program code which, when executed by a machine, causes the machine to perform a method, the method comprising:
receiving at a server a default principle sent from a default user manager in response to the default user manager authenticating a client of the server for access to an application within a container of the server;
receiving at a first user store in the container a first principle sent to the server from a first user manager in response to an authentication of the application for access to the first user manager;
receiving at a second user store in the container a second principle sent to the server from the second user manager in response to an authentication of the application for access to the second user manager;
the first user store storing the received first principle in a principle map within the container and separate from the application;
the second user store storing the received second principle in the principle map;
with the principle map, mapping the received default principle to the received first principle and the received second principle;
receiving at the first user store a first user manager command sent from the application in a first format, the received first user manager command including the default principle to indicate that an accessing of a first resource via the first user manager is on behalf of the client;
the first user store responding to the receiving the first user manager command, including
accessing the principle map with the default principle from the first user manager command to retrieve the first principle,
translating the first user manager command into a second format, the translated first user command including the retrieved first principle, and
sending the translated first user manager command to the first user manager, and
receiving at the second user store a second user manager command sent from the application in the first format, the received second user manager command including the default principle to indicate that an accessing of a second resource via the second user manager is on behalf of the client;
the second user store responding to the receiving the second user manager command, including
accessing the principle map with the default principle from the second user manager command to retrieve the second principle,
translating the second user manager command into a third format, the translated second user command including the retrieved second principle, and
sending the translated second user manager command to the second user manager.

19. The article of manufacture of claim 18, wherein the first user store and the second user store are connected to the application through the common application programming interface.

20. The article of manufacture of claim 19, the principle map connected to the application through the common application programming interface.

21. A computing system comprising instructions disposed on a computer readable medium, said instructions capable of being executed by said computing system to perform a method, said method comprising:

receiving at a server a default principle sent from a default user manager in response to the default user manager authenticating a client of the server for access to an application within a container of the server;

receiving at a first user store in the container a first principle sent to the server from a first user manager in response to an authentication of the application for access to the first user manager;

receiving at a second user store in the container a second principle sent to the server from the second user manager in response to an authentication of the application for access to the second user manager;

the first user store storing the received first principle in a principle map within the container and separate from the application;

the second user store storing the received second principle in the principle map;

with the principle map, mapping the received default principle to the received first principle and the received second principle;

receiving at the first user store a first user manager command sent from the application in a first format, the received first user manager command including the default principle to indicate that an accessing of a first resource via the first user manager is on behalf of the client;

the first user store responding to the receiving the first user manager command, including accessing the principle map with the default principle from the first user manager command to retrieve the first principle, translating the first user manager command into a second format, the translated first user command including the retrieved first principle, and sending the translated first user manager command to the first user manager, and receiving at the second user store a second user manager command sent from the application in the first format, the received second user manager command including the default principle to indicate that an accessing of a second resource via the second user manager is on behalf of the client;

the second user store responding to the receiving the second user manager command, including accessing the principle map with the default principle from the second user manager command to retrieve the second principle, translating the second user manager command into a third format, the translated second user command including the retrieved second principle, and sending the translated second user manager command to the second user manager.

22. The computing system of claim 21, wherein the first user store and the second user store are connected to the application through the common application programming interface.

23. The computing system of claim 22, the principle map connected to the application through the common application programming interface.

* * * * *

UNITED STATES PATENT AND TRADEMARK OFFICE
CERTIFICATE OF CORRECTION

PATENT NO. : 7,606,917 B1  Page 1 of 1
APPLICATION NO. : 10/837134
DATED : October 20, 2009
INVENTOR(S) : Blagoev et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1238 days.

Signed and Sealed this

Twelfth Day of October, 2010

David J. Kappos
*Director of the United States Patent and Trademark Office*